US010228461B2

(12) United States Patent
Laforest

(10) Patent No.: US 10,228,461 B2
(45) Date of Patent: Mar. 12, 2019

(54) ULTRASONIC DETECTION SYSTEM

(71) Applicant: Schneider Electric Industries SAS, Rueil-Malmaison (FR)

(72) Inventor: Benoit Laforest, Sommery (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 0 days.

(21) Appl. No.: 15/341,606

(22) Filed: Nov. 2, 2016

(65) Prior Publication Data
US 2017/0146653 A1 May 25, 2017

(30) Foreign Application Priority Data
Nov. 24, 2015 (FR) ...................................... 15 61279

(51) Int. Cl.
| G01S 15/04 | (2006.01) |
| G01K 11/28 | (2006.01) |
| G01K 11/22 | (2006.01) |
| B65C 9/42 | (2006.01) |
| G01S 7/521 | (2006.01) |

(Continued)

(52) U.S. Cl.
CPC ............... G01S 15/04 (2013.01); B65C 9/42 (2013.01); B65H 7/06 (2013.01); B65H 26/02 (2013.01); G01K 11/22 (2013.01); G01K 11/28 (2013.01); G01S 7/521 (2013.01); B65H 2511/22 (2013.01); B65H 2511/514 (2013.01); B65H 2511/518 (2013.01); B65H 2553/30 (2013.01); B65H 2701/192 (2013.01); B65H 2701/194 (2013.01)

(58) Field of Classification Search
None
See application file for complete search history.

(56) References Cited

U.S. PATENT DOCUMENTS 7,391,043 B2 * 6/2008 Ehrhardt, Jr. ............. B65C 9/42
250/559.29

FOREIGN PATENT DOCUMENTS

| DE | 20 2007 004 364 U1 | 6/2007 | |
| DE | 202007004364 U1 * | 6/2007 | ............... B65C 9/42 |
| DE | 20 2010 011 113 U1 | 11/2010 | |

(Continued)

OTHER PUBLICATIONS

French Preliminary Search Report dated Jul. 21, 2016 in French Application 15 61279, filed on Nov. 24, 2015 (with English Translation of Categories of cited documents & Written Opinion).

*Primary Examiner* — Laura Nguyen
(74) *Attorney, Agent, or Firm* — Oblon, McClelland, Maier & Neustadt, L.L.P.

(57) ABSTRACT

A system for detecting labels arranged on a support and spaced apart from one another by a spacing, the system including a transmitter part including a transmitter arranged to transmit a beam of ultrasonic waves towards the support which carries the labels, a receiver part, separated from the transmitter part, such that the support carrying the labels can pass along a plane located between the transmitter part and the receiver part, the transmitter part or the receiver part being arranged so that the beam of ultrasonic waves transmitted by the transmitter covers, on the support carrying the labels, a total surface area in which the surface area occupied by the spacing between two labels is greater than the surface area occupied by the labels.

8 Claims, 4 Drawing Sheets

(51) Int. Cl.
*B65H 26/02* (2006.01)
*B65H 7/06* (2006.01)

(56) References Cited

FOREIGN PATENT DOCUMENTS

| DE | 202010011113 U1 * | 11/2010 | ............... B65H 7/12 |
| EP | 2 570 354 A1 | 3/2013 | |
| EP | 2568469 A1 * | 3/2013 | ............. G10K 11/22 |

* cited by examiner

ULTRASONIC DETECTION SYSTEM

TECHNICAL FIELD OF THE INVENTION

The present invention relates to an ultrasonic detection system comprising a transmitter and a receiver. The system will be perfectly suitable for the detection of labels arranged adjacently on a support and separated from one another by a spacing. The detection system will be implemented, for example, in the form of an ultrasonic fork.

PRIOR ART

For product labeling, labels are arranged on a support immediately before being affixed to a product. On the support, the labels are separated from one another by a spacing.

Ultrasonic detection of the labels will be required when the optical contrast between the labels and their support is insufficient. This is the case, notably, when the labels are transparent and the support is opaque, when the labels and the support are both transparent, or, more generally, when the support and the labels have a similar level of opacity.

In these situations, there is a known way of using an ultrasonic detection system in the shape of a fork for the purpose of detecting the presence of the labels on the support. The support, usually consisting of a strip, passes between the two branches of the fork. One branch of the fork includes the transmitter, which has the function of sending a beam of ultrasonic waves, and the other branch of the fork includes the receiver, which has the function of capturing the beam attenuated by its passage through the support and/or the labels. The fork is calibrated to distinguish the labels from the support.

The U.S. Pat. No. 6,314,054 B1 describes an architecture of this type in which the transmitter and the receiver are each housed in a separate branch of the fork. For some applications, in order to achieve optimal placing of the label on the object to be labeled, the label detection must take place as closely as possible to the object. Since the distance between the strip and the object must be as small as possible, the thickness of at least one of the branches of the fork must be as small as possible. Existing solutions, such as that described in the U.S. Pat. No. 6,314,054 B1 are unsuitable because they are too bulky for these applications.

Patent application EP2568469A1 proposes to offset the transmitter and/or receiver. For this purpose, a deflector is used in the transmitter part and/or in the receiver part. With this architecture, it is difficult to obtain satisfactory detection contrast and performance within limited overall dimensions.

Patent documents DE202010011113U1, DE202007004364U1 and EP2570354A1 also describe label detection systems.

The object of the invention is to propose a detection system which may, for example, take the form of a fork, and can provide satisfactory contrast and performance in a label detection application, even within limited overall dimensions.

DISCLOSURE OF THE INVENTION

This object is achieved by a system for detecting labels arranged on a support and spaced apart from one another by a spacing, said system comprising:
  a transmitter part comprising a transmitter arranged to transmit a beam of ultrasonic waves towards the support which carries said labels,
  a receiver part, separated from the transmitter part, such that the support carrying the labels can pass along a plane located between the transmitter part and the receiver part, in a direction called the passage direction, and in a plane called the passage plane, the receiver part comprising a receiver arranged to generate an output signal on the basis of a beam of ultrasonic waves attenuated by the support and/or the labels,
  the transmitter part or the receiver part being arranged so that the ultrasonic beam transmitted by the transmitter covers, on the support carrying the labels, a total surface area in which the surface area occupied by the spacing between two labels is greater than the surface area occupied by the labels.

According to a particular feature of the invention, the transmitter part or the receiver part comprises a deflector having a shape which defines said total surface area.

According to another particular feature, the transmitter part is arranged to transmit the beam of ultrasonic waves in a direction located in a plane angularly offset from the plane perpendicular to the passage direction of the labels.

According to a first embodiment, the device comprises an angled reflection device arranged in the receiver part, and the angled reflection device comprises a first deflector arranged to deflect the attenuated beam of ultrasonic waves towards a second deflector, said second deflector being arranged to deflect the attenuated beam of ultrasonic waves towards the receiver.

In this first embodiment, the first deflector has an elongate shape along an axis perpendicular to its direction of deflection.

In this first embodiment, the second deflector is formed on a plane perpendicular to the passage plane of the support, and is orientated around an axis perpendicular to the passage plane, so as to deflect the beam of ultrasonic waves received from the first deflector towards the receiver, in a direction located in a plane which is inclined relative to a plane perpendicular to the passage plane and parallel to the passage direction of the support carrying the labels.

According to a second embodiment of the invention, the system comprises an angled reflection device arranged in the transmitter part, and the angled reflection device comprises a first deflector arranged to deflect the beam of ultrasonic waves transmitted by the transmitter towards a second deflector along a deflection direction at an angle of between 0° and 90° to the passage direction, said second deflector being arranged to deflect the transmitted beam of ultrasonic waves towards the receiver.

In this second embodiment, the first deflector is preferably formed on a plane perpendicular to the passage plane of the support, and is orientated around an axis perpendicular to the passage plane, so as to deflect the beam of ultrasonic waves received from the transmitter towards the second deflector.

In this second embodiment, the second deflector preferably has an elongate shape along an axis perpendicular to its direction of deflection.

According to the invention, the system is constructed in the form of a fork having a first branch in which the transmitter part is arranged, and a second branch in which the receiver part is arranged.

BRIEF DESCRIPTION OF THE DRAWINGS

Other characteristics and advantages will be apparent from the following detailed description, which refers to the attached drawings, in which.

DETAILED DESCRIPTION OF AT LEAST ONE EMBODIMENT

Figure 1:
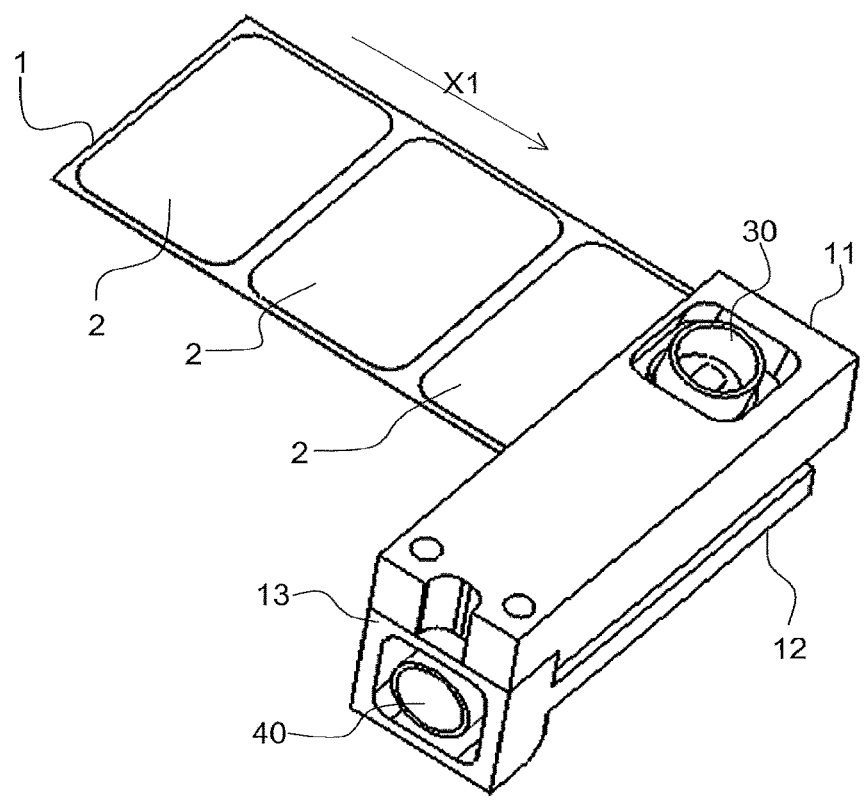
FIG. 1 shows, in a perspective view, the detection system of the invention, taking the form of a fork, suitable for the detection of labels on a support, according to a first embodiment.

The invention relates to an ultrasonic detection system used to detect a target in through-beam mode. The invention is entirely suitable for the detection of labels 2 arranged on a support. Ultrasonic detection is required when the labels and their support have a similar degree of opacity. As stated above, this is the case, for example, when the labels are transparent and the support is opaque, or when both the labels and the support are transparent. In the remainder of the description, we shall consider a support in the form of a transparent strip 1 and labels positioned at regular intervals on said strip.

The labels 2 are arranged on the strip, an identical spacing with a width e always being provided between two successive labels 2.

The detection system comprises a transmitter part comprising a transmitter 30 arranged to transmit a beam F1 of ultrasonic waves towards the strip 1 carrying the labels, and a receiver part comprising a receiver 40 arranged to generate an output signal representing the beam F2 of ultrasonic waves, resulting from the transmission of the beam F1 of ultrasonic waves through the strip, the beam F1 having been attenuated by the strip and/or the labels. A processing unit (not shown) is then designed to interpret the signal corresponding to the attenuated beam F2 of ultrasonic waves, in order to determine the presence of the labels.

With reference to the attached figures, the transmitter part and the receiver part are preferably accommodated in a housing taking the form of a fork having two parallel branches, namely a first branch 11 for the transmission of the beam of ultrasonic waves and a second branch 12 for the reception of the attenuated beam of ultrasonic waves. The first branch 11 and the second branch 12 are interconnected at one of their ends by a junction part 13. The strip 1 carrying the labels 2 is designed to pass in a longitudinal passage direction X1 between the two branches 11, 12 of the fork, in a plane, called the passage plane, which is transverse with respect to the direction X2 of the transmitted beam of ultrasonic waves.

The invention is intended to propose a detection solution using at least one offset transducer, such that a fork with a limited thickness is proposed. Within these reduced overall dimensions, the solution according to the invention makes it possible to maximize the contrast between the labels 2 and the strip 1, and to conserve sufficient acoustic energy to perform the detection. As regards the contrast, it is necessary to ensure that, within the total surface area S1 (FIG. 2) covered by the beam on the target (strip+labels), the surface area occupied by the spacing e is greater than the surface area occupied by the labels, even if the first branch 11 or the second branch 12 is formed within smaller overall dimensions. More precisely, within the total surface area S1, the surface area occupied by the spacing will be at least twice as great as that occupied by the labels.

According to the invention, the transmitter part or the receiver part is arranged to achieve this aim. Preferably, the transmitter part or the receiver part thus comprises a deflector having a shape which defines said total surface area.

According to the invention, the detection system uses an angled reflection device which incorporates the deflector described above. Two different embodiments may be distinguished. In a first embodiment, the angled reflection device is designed to deflect the attenuated beam F2 of ultrasonic waves towards the receiver. In a second embodiment, the angled reflection device is designed to deflect the beam F1 of ultrasonic waves transmitted by the transmitter towards the target and the receiver.

In the remainder of the description and in the attached drawings, we will mainly detail the first embodiment, although it is to be understood that the architecture and operating principle are identical overall for the second embodiment. The architecture of the second embodiment is exactly the inverse of that of the first embodiment.

In both embodiments, the transmitted beam F1 of ultrasonic waves has the particular feature of striking the target formed by the strip 1 carrying the labels 2 in the direction X2, which lies on a plane offset angularly from a plane perpendicular to the passage direction X1 of the labels.

With reference to FIG. 1, in the first embodiment, the receiver 40 is offset, near the junction part 13 of the fork, so as to receive the attenuated beam of ultrasonic waves in a direction X3 located in a plane which is inclined with respect to a plane perpendicular to the passage plane and orientated in the passage direction of the strip carrying the labels, so as to limit interference.

The angled reflection device is located in the receiver part and located on the path of the attenuated beam F2 of ultrasonic waves, so as to direct this beam towards the receiver 40. This angled reflection device is positioned at the end of the second branch 12 of the fork opposite the junction part, and comprises two deflectors 400, 401 arranged to deflect the attenuated beam F2 of ultrasonic waves. The first deflector 400 is arranged to deflect the beam F2 of ultrasonic waves attenuated by the strip 1 and/or the labels 2 towards the second deflector 401, in a direction substantially parallel to the passage direction X1 of the strip 1. Clearly, it would be feasible for the first deflector 400 to be arranged to deflect the attenuated beam of ultrasonic waves in a different direction of deflection, for example a direction at an angle of between 0° and 90° to the passage direction X1 in all spatial planes.

The first deflector 400 preferably has an elongate shape along an axis perpendicular to its direction of deflection. The length of the first deflector 400 is chosen to be considerably greater than the width e of the spacing, so as to collect the maximum amount of acoustic energy within the specified limited dimensions. The width of the first deflector 400 is chosen on the basis of the 20, overall dimensional constraint on the thickness of the branch, and with allowance for the acoustic energy to be transmitted and the contrast. The first deflector 400 has a flat or concave inclined surface, the inclination of which is chosen according to the direction of deflection to be imparted to the beam. Preferably, it has a generally rectangular shape, the width of which is chosen to be greater than the width e of the spacing present between two successive labels on the strip.

The second deflector 401 comprises a flat or concave surface designed to deflect the beam of ultrasonic waves received from the first deflector 400 towards the receiver 40, in the direction X3 defined above. The second deflector 401, made in the form of a flat surface, is orientated along a plane which is preferably perpendicular to the passage plane of the strip and suitably orientated around an axis perpendicular to the passage plane, so as to deflect the beam.

Figure 8:
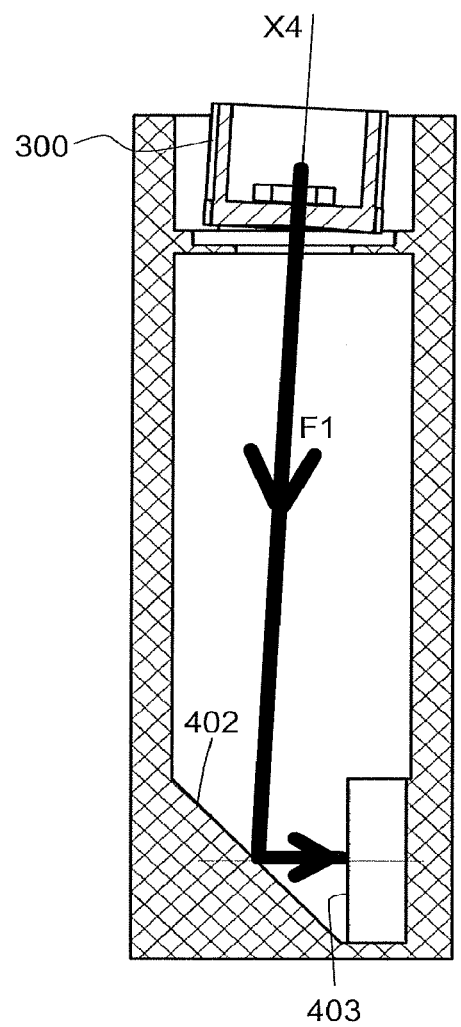
FIG. 8 shows a longitudinal section through the detection system along the first branch, to illustrate the operating principle of the second embodiment of the invention.

In the second embodiment mentioned above and illustrated in FIG. 8, the transmitter 300 is offset towards the junction part of the fork, and the angled reflection device is arranged in the first branch to direct the beam of ultrasonic waves transmitted by the transmitter towards the target in a direction equivalent to the direction X2 which was previously defined for the first embodiment described above. The receiver is then arranged in the second branch and directly receives the attenuated beam F2 of ultrasonic waves after its passage through the target.

In this second embodiment, the transmitter 300 is orientated so as to transmit a beam of ultrasonic waves in a direction X4 located in a plane which is inclined with respect to a plane perpendicular to the passage plane and parallel to the passage direction of the strip carrying the labels. The degree of inclination of the transmitter relative to the passage plane and its position relative to the strip make it possible to adjust the level of interference.

The angled reflection device of the transmitter part is located on the path of the beam F1 of ultrasonic waves transmitted by the transmitter 300. The angled reflection device is positioned at the end of the first branch of the fork opposite the junction part 13, and comprises two deflectors arranged to deflect the transmitted beam F1 of ultrasonic waves so as to direct it towards the strip, in a direction lying on a plane which is angularly offset from a plane perpendicular to the passage direction X of the labels.

The first deflector 402 comprises a flat or concave surface designed to deflect the beam F1 of ultrasonic waves received from the transmitter 300 towards the second deflector 403. The first deflector 402, if made in the form of a flat surface, is orientated along a plane which is preferably perpendicular to the passage plane of the strip and suitably orientated around an axis perpendicular to the passage plane, so as to deflect the beam of ultrasonic waves towards the second deflector 403.

In this second embodiment, the second deflector 403 is arranged to deflect the beam of ultrasonic waves received from the first deflector 402 towards the strip and in the direction X2 defined previously for the first embodiment.

As in the first embodiment, the second deflector 403 preferably has an elongate shape along an axis perpendicular to its direction of deflection. Its shape, its arrangement and the resulting benefits are identical to those described above for the first deflector 400 in the first embodiment.

In this second embodiment, the receiver is positioned so as to receive the beam of ultrasonic waves deflected by the second deflector in the direction X2, defined previously for the first embodiment.

Preferably, the diaphragm of the transmitter in the first embodiment and/or the diaphragm of the receiver in the second embodiment may have a generally quasi-rectangular shape, so as to collect most of the ultrasonic waves that are incident on the spacing present between two labels.

Figure 2:
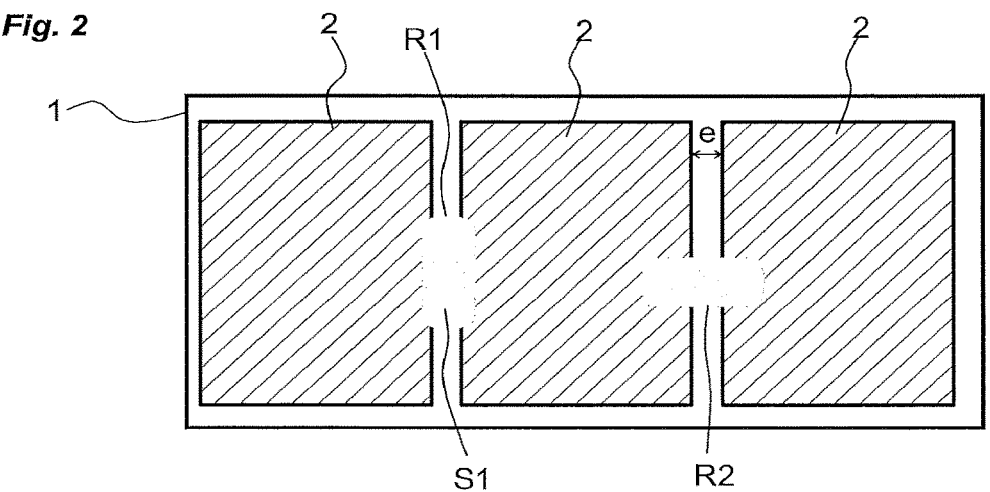
FIG. 2 shows the operating principle of the invention.
Figure 3:
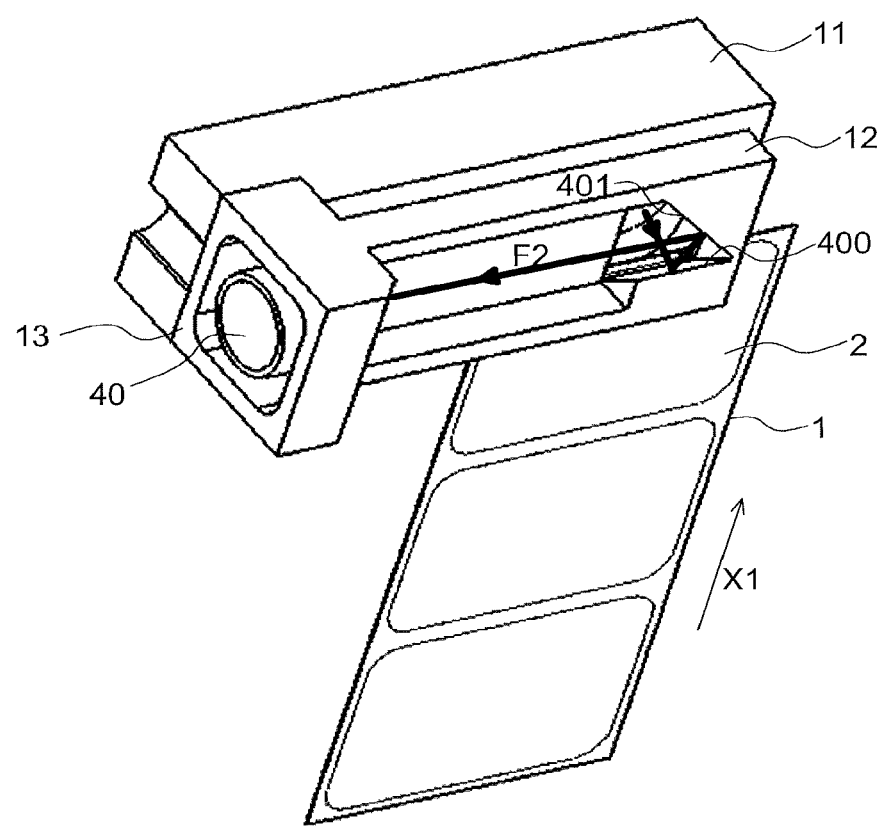
FIG. 3 shows, in an opened view, the second branch of the detection system of the invention according to the first embodiment.
Figure 4:
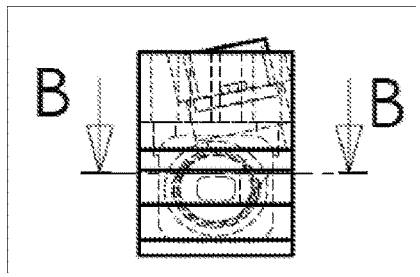
FIG. 4 shows the detection system of the invention in a front view, according to the first embodiment.
Figure 5:
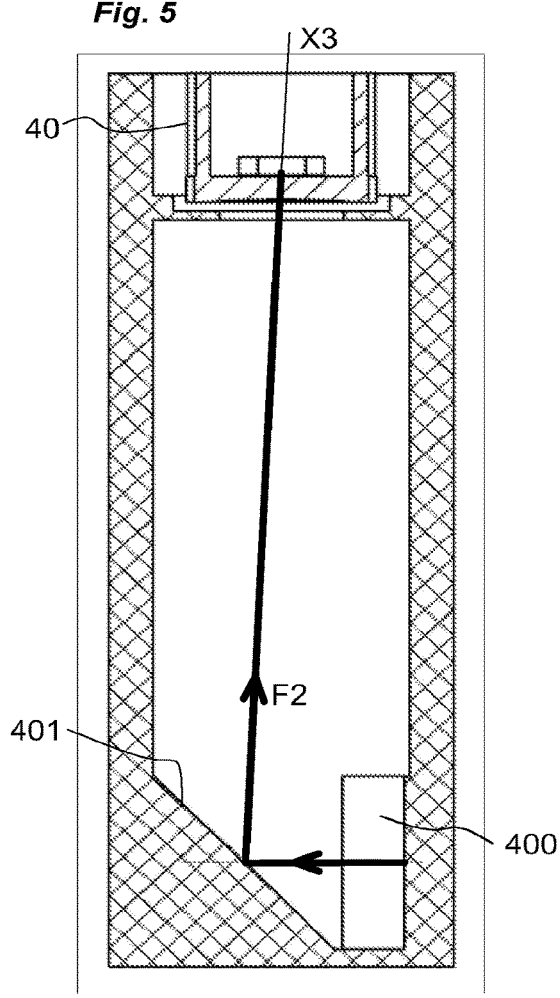
FIG. 5 shows a longitudinal section through the detection system taken through its second branch, along the line B-B in FIG. 4.
Figure 6:
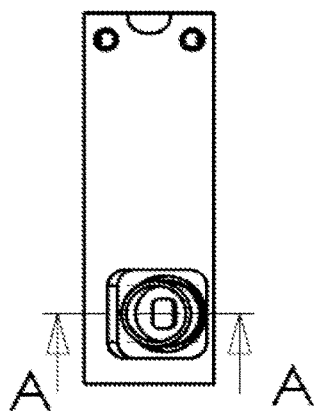
FIG. 6 shows the detection system of the invention in a top view, according to the first embodiment.
Figure 7:
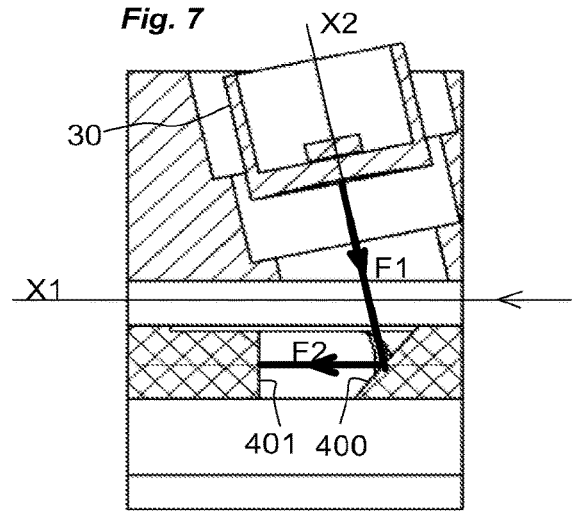
FIG. 7 shows a cross section through the detection system, taken along the line A-A in FIG. 6.

The solution thus has numerous advantages. It provides accurate detection of the labels carried on the strip. This detection, accuracy is provided within limited overall dimensions. In fact, even if the height of the first or second branch of the fork is reduced, the elongate shape of the deflector in a direction transverse to the passage direction of the strip enables satisfactory contrast and performance to be maintained. FIG. 2 will aid the understanding of the invention. The rectangle R1 corresponds to the surface area S1 covered by the beam of ultrasonic waves on the strip, when the detection system according to the invention is used. The rectangle R2 corresponds to the surface area covered by the beam of ultrasonic waves on the strip when a detection system known from the prior art is used. It is evident from this figure that the contrast will be greater with the solution according to the invention.

The invention claimed is:

1. A system for detecting labels arranged on a support and spaced apart from one another by a spacing, said system comprising:
 a transmitter part comprising a transmitter arranged to transmit a beam of ultrasonic waves towards the support which carries said labels; and
 a receiver part, separated from the transmitter part, such that the support carrying the labels can pass along a plane located between the transmitter part and the receiver part, in a passage direction, and in a passage plane, the receiver part comprising a receiver arranged to generate an output signal on the basis of a beam of ultrasonic waves attenuated by the support and/or the labels,
 wherein the transmitter part or the receiver part is arranged so that the beam of ultrasonic waves transmitted by the transmitter covers, on the support carrying the labels, a total surface area, and within this total surface area, the surface area occupied by the spacing between two successive labels is greater than the surface area occupied by the labels, and
 wherein an angled reflection device is arranged in the receiver part, the angled reflection device including a first deflector arranged to deflect the attenuated beam of ultrasonic waves towards a second deflector, the second deflector being arranged to deflect the attenuated beam of ultrasonic waves towards the receiver.

2. The system according to claim 1, wherein the first deflector has a shape which defines said total surface area.

3. The system according to claim 1, wherein the transmitter part is arranged to transmit the beam of ultrasonic waves in a direction located in a plane angularly offset from the plane perpendicular to the passage direction of the labels.

4. The system according to claim 1, wherein the first deflector has an elongate shape along an axis perpendicular to its direction of deflection.

5. The system according to claim 1, wherein the second deflector is formed on a plane perpendicular to the passage plane of the support, and is orientated around an axis perpendicular to the passage plane, so as to deflect the beam of ultrasonic waves received from the first deflector towards the receiver, in a direction located in a plane which is inclined relative to a plane perpendicular to the passage plane and parallel to the passage direction of the support carrying the labels.

6. A system for detecting labels arranged on a support and spaced apart from one another by a spacing, said system comprising:

a transmitter part comprising a transmitter arranged to transmit a beam of ultrasonic waves towards the support which carries said labels; and a receiver part, separated from the transmitter part, such that the support carrying the labels can pass along a plane located between the transmitter part and the receiver part, in a passage direction, and in a passage plane, the receiver part comprising a receiver arranged to generate an output signal on the basis of a beam of ultrasonic waves attenuated by the support and/or the labels, wherein an angled reflection device is arranged in the transmitter part, the angled reflection device including a first deflector and a second deflector, the first deflector being arranged to deflect the beam of ultrasonic waves transmitted by the transmitter towards the second deflector along a deflection direction at an angle of between 0° and 90° to the passage direction, said second deflector being arranged to deflect the transmitted beam of ultrasonic waves towards the receiver, and the transmitter part or the receiver part is arranged so that the beam of ultrasonic waves transmitted by the transmitter covers, on the support carrying the labels, a total surface area, and within this total surface area, the surface area occupied by the spacing between two successive labels is greater than the surface area occupied by the labels.

7. The system according to claim 6, wherein the first deflector is formed on a plane perpendicular to the passage plane of the support, and is orientated around an axis perpendicular to the passage plane, so as to deflect the beam of ultrasonic waves received from the transmitter towards the second deflector.

8. The system according to claim 6, wherein the second deflector has an elongate shape along an axis perpendicular to its direction of deflection.

* * * * *